United States Patent
Haber et al.

(10) Patent No.: US 11,563,566 B2
(45) Date of Patent: Jan. 24, 2023

(54) KEY SPLITTING

(71) Applicant: HEWLETT PACKARD ENTERPRISE DEVELOPMENT LP, Houston, TX (US)

(72) Inventors: Stuart Haber, Princeton, NJ (US); Liqun Chen, Bristol (GB)

(73) Assignee: Micro Focus LLC, Santa Clara, CA (US)

( * ) Notice: Subject to any disclaimer, the term of this patent is extended or adjusted under 35 U.S.C. 154(b) by 1130 days.

(21) Appl. No.: 15/500,530

(22) PCT Filed: Oct. 27, 2014

(86) PCT No.: PCT/US2014/062407
§ 371 (c)(1),
(2) Date: Jan. 31, 2017

(87) PCT Pub. No.: WO2016/068847
PCT Pub. Date: May 6, 2016

(65) Prior Publication Data
US 2017/0222800 A1    Aug. 3, 2017

(51) Int. Cl.
| | |
|---|---|
| H04L 9/08 | (2006.01) |
| H04L 12/417 | (2006.01) |
| H04L 12/46 | (2006.01) |
| H04L 9/00 | (2022.01) |
| H04L 9/14 | (2006.01) |

(52) U.S. Cl.
CPC .............. *H04L 9/085* (2013.01); *H04L 9/008* (2013.01); *H04L 9/0861* (2013.01); *H04L 9/0877* (2013.01); *H04L 9/0894* (2013.01); *H04L 9/14* (2013.01); *H04L 12/417* (2013.01); *H04L 12/4625* (2013.01); *H04L 2209/04* (2013.01)

(58) Field of Classification Search
None
See application file for complete search history.

(56) References Cited

U.S. PATENT DOCUMENTS

| | | | |
|---|---|---|---|
| 7,096,504 B1 | 8/2006 | Tagawa et al. | |
| 8,468,345 B2 | 6/2013 | Auradkar et al. | |
| 2002/0073318 A1* | 6/2002 | Gennaro | G06Q 20/02 713/176 |
| 2006/0256963 A1* | 11/2006 | Gebotys | H04L 9/003 380/205 |

(Continued)

FOREIGN PATENT DOCUMENTS

| | | |
|---|---|---|
| EP | 1722502 A1 | 11/2006 |
| TW | 201438449 A | 10/2014 |

(Continued)

OTHER PUBLICATIONS

Dey, Somdip, Shalabh Agarwal, and Asoke Nath. "Confidential encrypted data hiding and retrieval using qr authentication system." In 2013 International Conference on Communication Systems and Network Technologies, pp. 512-517. (Year: 2013).*

(Continued)

*Primary Examiner* — Luu T Pham
*Assistant Examiner* — Edward X Long
(74) *Attorney, Agent, or Firm* — Sheridan Ross P.C.

(57) ABSTRACT

According to an example, key splitting may include utilizing a masked version of a master key that is masked by using a mask.

18 Claims, 8 Drawing Sheets

(56) References Cited

U.S. PATENT DOCUMENTS

| | | | |
|---|---|---|---|
| 2008/0019503 A1* | 1/2008 | Dupaquis | H04L 9/003 380/28 |
| 2008/0056490 A1* | 3/2008 | Akishita | H04L 9/002 380/44 |
| 2012/0179920 A1 | 7/2012 | Farrugia et al. | |
| 2012/0321076 A1 | 12/2012 | Shah et al. | |
| 2013/0136258 A1 | 5/2013 | Grube et al. | |
| 2013/0236005 A1* | 9/2013 | Ikeda | H04L 9/003 380/28 |
| 2013/0243191 A1* | 9/2013 | Komano | H04L 9/0861 380/44 |
| 2013/0259226 A1 | 10/2013 | Ciet et al. | |
| 2013/0275776 A1* | 10/2013 | Baptist | H04L 67/1097 713/193 |
| 2014/0007189 A1* | 1/2014 | Huynh | G06F 3/0622 726/3 |
| 2014/0201526 A1 | 7/2014 | Burgess | |
| 2014/0281529 A1* | 9/2014 | Epp | H04L 63/0428 713/168 |
| 2014/0344569 A1* | 11/2014 | Li | G06F 21/60 713/164 |
| 2015/0082019 A1* | 3/2015 | Waisbard | H04L 63/0435 713/150 |
| 2015/0163054 A1* | 6/2015 | Roelse | H04L 9/0838 380/278 |
| 2015/0244710 A1* | 8/2015 | Koster | G06F 21/44 713/171 |
| 2015/0372812 A1* | 12/2015 | Parann-Nissany | H04L 63/06 380/44 |

FOREIGN PATENT DOCUMENTS

| | | |
|---|---|---|
| WO | WO-2015198314 | 12/2015 |
| WO | WO-2016057148 | 4/2016 |

OTHER PUBLICATIONS

Zhao, Kai, and Lina Ge. "A survey on the internet of things security." In 2013 Ninth international conference on computational intelligence and security, pp. 663-667. (Year: 2013).*

Malathi, et al., "Secure Overlay Cloud Storage with Access Control and Assured Deletion", IJRIT, vol. 2, Issue 5, May 2014, Tamil Nadu, India, 11 pages.

Nowshad, K. et al., "Provide Reliability File Access Control on Cloud Storage", Journal Research in Computer & Scientific Technology (JRCST), Aug. 2013, 5 pages.

Tang, Y. et al., "FADE: Secure Overlay Cloud Storage with File Assured Deletion", <http://www.cse.cuhk.edu.hk/~pclee/www/pubs/securecomm10.pdf >, 2014, 18 pages.

European Patent Office, Supplemental European Search Report for EP Appl. No. 14905063.5 dated May 14, 2018 (8 pages).

Korean Intellectual Property Office, International Search Report & Written Opinion for PCT/US2014/062407 dated Jul. 14, 2015 (11 pages).

Krawczyk et al., Internet Engineering Task Force (IETF), Request for Comments: 5869, Category: Informational, ISSN: 2070-1721. HMAC-based Extract-and-Expand Key Derivation Function (HKDF), May 2010 (14 pages).

* cited by examiner

KEY SPLITTING

BACKGROUND

Encryption is the process of encoding information such that the encrypted information is read by authorized entities. With respect to encryption, the information, which is typically referred to as plaintext, is encrypted using an encryption process. The encrypted information is referred to as ciphertext. In order to read the ciphertext, a key is typically used to decrypt the ciphertext.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
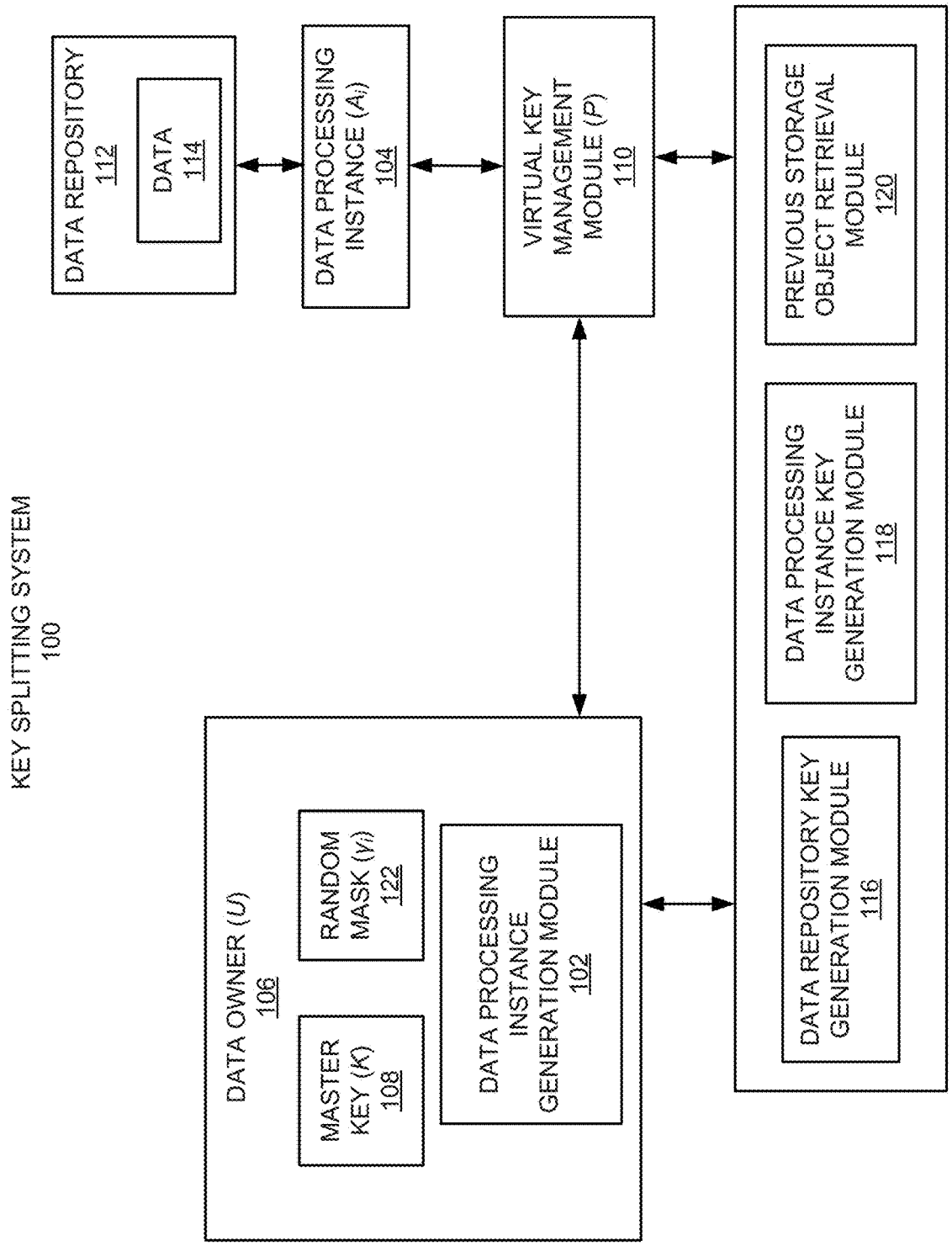
FIG. 1 illustrates an architecture of a key splitting system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Symmetric keys for encryption and decryption of data typically include the use of the same cryptographic keys for both encryption of plaintext and decryption of ciphertext. With respect to symmetric keys, the keys are typically identical, or there may be a transformation that is performed between the two keys. Asymmetric keys for encryption and decryption of data typically include two separate keys, one of which is secret (or private) and one of which is public. With regard to encryption and decryption of data, key splitting typically includes the division of a key or decryption process into two or more parts so that no part in itself may be used without reconstructing the key by uniting all of its parts.

Authentication processes may include processes to determine whether the data that is received is the data that was sent. Authentication processes may also include processes related to validation of the authenticity of data by using, for example, hash-based message authentication (HMAC)), and other validation techniques.

Key management may include the management of keys for encryption, decryption, and authentication of data, and/or for the generation of additional keys. For example, for key management, each master key and its corresponding set of encrypted data items may be placed under the control of a single data owner. This type of key management may be used as part of computing systems that provide cryptographic services that use symmetric-key cryptographic mechanisms (which include symmetric encryption and symmetric authentication processes). For such symmetric key based cryptographic services, the sender and the receiver of a message, or the writer and the reader of a stored file, generally share the same specific encryption/decryption key or the same specific authentication key, or one of each. Access to this key may be managed by a key manager that may include key splitting capabilities.

As described herein, key splitting typically includes the division of a key or the division of a decryption process into two or more parts so that no part in itself may be used to reconstruct the key. Rather, each part may need to be united to reconstruct the key. Thus, key splitting provides a data owner (hereinafter designated U, or user U) control of aspects such as encryption, decryption, and authentication of data by preventing other entities from ascertaining the key or the decryption process.

With respect to key splitting, the data owner U may utilize a key manager (hereinafter designated P) to manage keys that are used for data protection. The data owner U may create ephemeral data processing instances (with a specific $i^{th}$ data processing instance being designated as $A_i$) that provide for data protection. For example, an ephemeral data processing instance may perform data encryption or decryption on behalf of the data owner U on a set of data, and thereafter, the ephemeral data processing instance may be discarded. The key manager may not be trusted with having knowledge of the values of the keys.

In some examples, communication with the key manager P may use a partially homomorphic encryption technique, such as ElGamal encryption. The ElGamal encryption technique is an asymmetric key encryption process for public-key cryptography which is based on the Diffie-Hellman key exchange. With respect to communication with the key manager P, other types of encryption techniques may be used as well.

With respect to key splitting, the data owner U may create a master key (hereinafter designated K). Specific keys that are used to manage data objects (i.e., parts of the data owned by the data owner U) on behalf of the data owner may be derived from the master key K. In order to handle specific keys for individual data objects, the data owner U may initiate the creation of an ephemeral data processing instance $A_i$, and may send to the data processing instance $A_i$ an encryption of the master key K under the key manager's public key. The data processing instance $A_i$ may generate a random mask $\gamma_i$.

The data processing instance $A_i$ may use the homomorphic property of an asymmetric key encryption process to combine an encryption of the random mask $\gamma_i$ with the encryption of the master key K. The homomorphic property may refer to a form of encryption which allows specific types of computations to be carried out on ciphertext and to generate an encrypted result which, when decrypted, matches the result of operations performed on the original text that is used to generate the ciphertext. In this example, the resulting ciphertext generated by the combination of the encryption of the random mask $\gamma_i$ and the master key K is an encryption of $K*\gamma_i$ (i.e., the product of K and H. The ciphertext of K and $\gamma_i$ may be determined in the group structure (e.g., a group G for ElGamal encryption), underlying the asymmetric key encryption process that includes the homomorphic property. The data processing instance $A_i$ may send this ciphertext to the key manager P. Further, the data processing instance $A_i$ may record the value of the random mask $\gamma_i$.

The random mask $\gamma_i$ may be used as a mask shared by the key manager P and the ephemeral instantiation of the data processing instance. The random mask $\gamma_i$ may be shared implicitly, in that the key manager P does not know the value of the random mask $\gamma_i$. The key manager P thus invokes the use of the random mask $\gamma_i$ through its implicit but not explicit knowledge. The key manager P may use a secret key to decrypt the masked master key (i.e., the ciphertext of K and $\gamma_i$) to obtain the value $K*\gamma_i$ (the product of K and $\gamma_i$), and store the value for communication with this data processing instance $A_i$.

A specific key for encryption, decryption, and/or other authentication of an individual data object may be created to be of the form $\alpha_j/K$, where $\alpha_j$ is a random value, so that the data processing instance $A_i$ knows the key, while the key manager P knows $\alpha_j$ and stores $\alpha_j$ as a mask for this key. For example, the key manager may select a random value $\alpha_j$, and send $\alpha_j/(K*\gamma_i)$ to the data processing instance $A_i$ that knows $\gamma_i$, so that the data processing instance may determine $[\alpha_j/(K*\gamma_i)]\gamma_i$ to recover $\alpha_j/K$. These values related to $\alpha_j$, K, and $\gamma_i$, and all related operations may be in the underlying group (e.g., a group G for ElGamal encryption) that includes the homomorphic property. The processes described above with respect to creation of a specific key for an individual data object may be used later, after this data processing instance $A_i$ is no longer in existence, to allow the key manager P to provide for a newly created data processing instance to recover the same key, using the original mask $\alpha_j$ for this key $\alpha_j/K$, and the new value of $\gamma_i$ that is used as its mask shared with this data processing instance.

According to examples, a key splitting system and a method for key splitting are disclosed herein. With respect to key splitting, the system and method may generally utilize any secure communications system, without the need for a homomorphic encryption technique. Non-limiting examples of secure communications systems may include systems that use secure asymmetric encryption techniques such as RSA, elliptic curve cryptography, etc. Homomorphic encryption may be generally described as a form of encryption which allows specific types of computations to be carried out on ciphertext and generate an encrypted result which, when decrypted, matches the result of operations performed on the plaintext. The avoidance of the need to use the homomorphic encryption techniques may reduce computational cost (e.g., processing time, storage, energy usage, etc.). For example, with respect to use of the asymmetric key encryption processes that include a homomorphic property, such techniques may be computationally cost intensive based on the use of relatively longer group elements (e.g., 2048 bits long), compared to relatively shorter bit-strings (e.g., 128 or 256 bits long) that are usable with the example system and method disclosed herein.

For the example system and method disclosed herein, the random mask $\gamma_i$ may be selected by the data owner (i.e., the data owner U may select a random value for the mask $\gamma_i$), such that an asymmetric encryption technique may be used for key splitting. With respect to the term data owner U as used herein, the functionality described as performed by the data owner U and the information related to the data owner U may be performed by and related to a data owner computing device. Generally, for the system and method disclosed herein, the data owner U may select a random mask $\gamma_i$, encrypt $\gamma_i*K$ under the key manager's public key, and send the ciphertext along with the random mask $\gamma_i$ to the data processing instance $A_i$. The "*" symbol may represent any operation, such as XOR, multiplication, addition, etc. The data processing instance $A_i$ may record the random mask $\gamma_i$, and forward the ciphertext to the key manager P, which may decrypt and record $\gamma_i*K$. With respect to the term key manager P as used herein, the functionality described as performed by the key manager P and the information related to the key manager P may be performed by and related to a key manager computing device For the example system and method disclosed herein, the values K, $\gamma_i$, and $\alpha_j$ may be bit-strings of an appropriate length, regarded as elements of a group that is of fixed length bit-strings, with bit-wise XOR as the group operation. The computations $K*\gamma_i$, $\alpha_j/K$, etc. of the aforementioned key splitting service may be computations in this convenient group. The length of the keys may be selected according to the cryptographic service (e.g., the particulars of the encryption, decryption, or authentication process) for which keys are being managed.

For the example system and method disclosed herein, compared to the use of homomorphic encryption techniques, assuming a key length for a secure symmetric-key system is 256 bits, XOR operations on 256-bit values may be generally more efficient than homomorphic encryption operations. These 256-bit values may be considered secure with respect to cryptanalytic techniques. As computational power increases (e.g., per Moore's law, etc.) and as cryptanalysis improves, these bit lengths may gradually increase. The symmetric-key length may be expected to continue to stay correspondingly shorter than the asymmetric-key lengths. Further, for the example system and method disclosed herein, the need to convert group elements $\alpha_j/K$ into useable symmetric keys is also eliminated, since these values may be used directly as bit-strings. For example, the values K and $\alpha_j$ may be bit-strings of an appropriate length, regarded as elements of a group that is of fixed length bit-strings, with bit-wise XOR as the group operation.

According to an example, the key splitting system may include at least one processor, and a memory storing machine readable instructions that when executed by the at least one processor cause the at least one processor to receive a master key K from an entity (e.g., the data owner U) that is related to data that is to be encrypted, decrypted, or authenticated. A data key $S_j$ that is to be used to encrypt, decrypt, or authenticate the data may be derived from the master key K and a mask $\gamma_i$ that is received from the entity that is related to the data. The machine readable instructions may further forward a version (e.g., $K*\gamma_i$) of the master key that is masked by using the mask to a key manager P to manage the data key $S_j$, and generate a data processing instance $A_i$ to utilize the data key to encrypt, decrypt, or authenticate the data. The machine readable instructions may further determine the data key $S_j$ to encrypt, decrypt, or authenticate the data based on a previous data key (e.g., a known $S_j$) selected by the data processing instance $A_i$.

Figure 2:
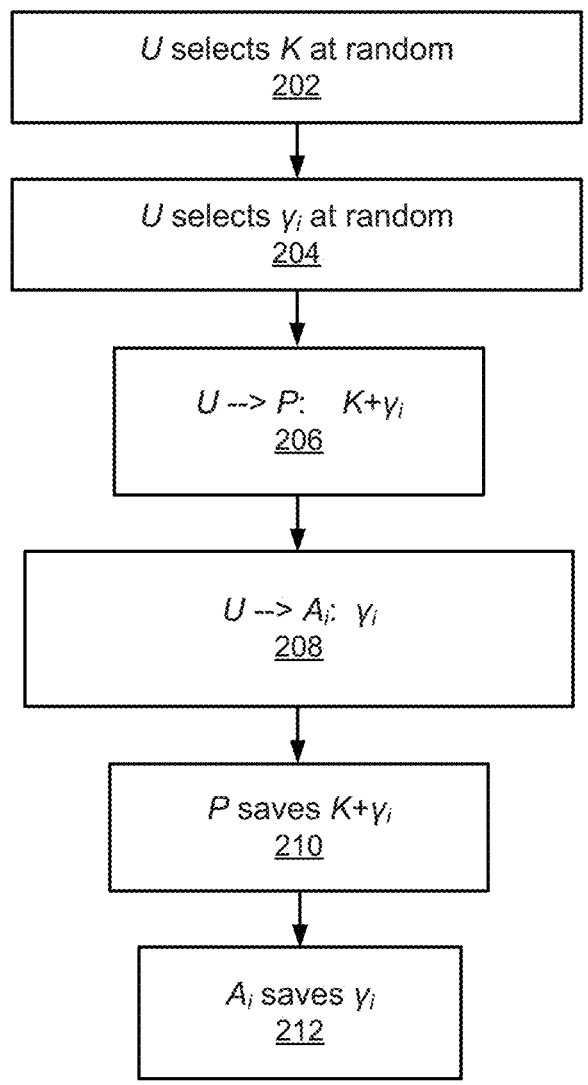
FIG. 2 illustrates a flowchart of a data processing instance generation protocol for the key splitting system of FIG. 1, according to an example of the present disclosure.

FIG. 1 illustrates an architecture of a key splitting system (hereinafter also referred to as "system 100"), according to an example of the present disclosure. Referring to FIGS. 1 and 2, the system 100 is depicted as including a data processing instance generation module 102 to generate an instantiation i of a data processing instance 104, with the $i^{th}$ instantiation of the data processing instance 104 being designated $A_i$. The data processing instance generation module 102 may implement a data processing instance generation protocol 200 as described herein with reference to FIG. 2. The data processing instance $A_i$ may be instantiated with the assistance of a data owner 106 (designated U) which holds a master key 108 (designated K) and a virtual key management module 110 (designated P). The data owner U may also select a random mask 122 (designated $\gamma_i$) to generate a masked version of the master key K, as described herein with reference to the data processing instance generation protocol 200. The virtual key management module P, which may be in a system that is separate from a system that includes the data owner U, or which may be in the same system as the data owner U, may facilitate the maintenance of the various encryption keys across different instantiations $A_i$ of the data processing instance 104. For the data processing instance generation protocol 200, communication may not be needed between the data owner U and the virtual key management module P.

In order to retrieve decrypted data from a data repository 112 that includes data 114, the data owner U may initiate a data processing instance $A_i$. The data processing instance $A_i$ may be ephemeral. The data processing instance $A_i$ may be used to interact with the virtual key management module P in order to reconstruct specific keys. The state between different instantiations of the data processing instance $A_i$ may be maintained by having the data owner U use the same master key K in all instantiations $A_i$, and by having the virtual key management module P store a masked version of the specific key $S_j$*K (where $S_j$ represents a string that represents a $j^{th}$ specific key for encrypting, decrypting, or authenticating, or validating the authentication of a data object).

A data repository key generation module 116 of the system 100 may generate a new specific key $S_j$ to be used to encrypt, decrypt, or authenticate, or validate the authentication of the data 114 on the data repository 112. The data repository key generation module 116 may be implemented by the data owner U and/or by the virtual key management module P, but is shown as being independently implemented in the example of the system 100 of FIG. 1. The data repository key generation module 116 may implement a data repository key generation protocol 300 as described herein with reference to FIG. 3. The data repository key generation module 116 may provide for the storage and use of a blinded (i.e., masked) version of this specific key $S_j$ by the virtual key management module P.

A data processing instance key generation module 118 of the system 100 may provide for the data processing instance 104 to dynamically generate specific keys $S_j$, and to transmit a blinded version of the generated keys to the virtual key management module P. The data processing instance key generation module 118 may be implemented by the data owner U and/or by the virtual key management module P, but is shown as being independently implemented in the example of the system 100 of FIG. 1. The data processing instance key generation module 118 may implement a data processing instance key generation protocol 400 as described herein with reference to FIG. 4.

A previous storage object retrieval module 120 of the system 100 may implement the retrieval of a previous storage object from the data repository 112. The previous storage object retrieval module 120 may be implemented by the data owner U and/or by the virtual key management module P, but is shown as being independently implemented in the example of the system 100 of FIG. 1. The previous storage object retrieval module 120 may implement a previous storage object retrieval protocol 500 as described herein with reference to FIG. 5.

For the system 100, different entities may communicate securely among themselves using channels that are implemented, for example, via Secure Sockets Layer (SSL) or Transport Layer Security (TLS) built on an existing public key infrastructure (PKI). With reference to FIGS. 1-5, the keys and masking elements K, $S_j$, $\alpha_j$, etc. may be bit-strings of the appropriate length (i.e., bit-strings for the cryptographic key processes whose keys are being managed by using the key-splitting protocols of the system 100), and "+" may be used for exclusive or (XOR).

FIG. 2 illustrates the flowchart of the data processing instance generation protocol 200 for generation of a data processing instance $A_i$, according to an example of the present disclosure. Although execution of the methods described below is with reference to the system 100 of FIG. 1, other suitable devices for execution of these methods will be apparent to those of skill in the art. The method described in the flowchart of FIG. 2, and the methods described in the other figures may be implemented in the form of executable instructions stored on a machine-readable storage medium, such as the memory 806 and/or the secondary data storage 808 of FIG. 8, by one or more modules described herein, and/or in the form of electronic circuitry.

Referring to FIG. 2, at block 202, the data owner U may select the master key K at random (i.e., select a random value for the master key K). Alternatively, the data owner U may retrieve the master key K from a selection of previously generated keys.

At block 204, the data owner U may select the random mask $\gamma_i$ (i.e., select a random value for the mask $\gamma_i$).

At block 206, the data owner U may send the master key K XOR the random mask $\gamma_i$ (i.e., K+$\gamma_i$) to the virtual key management module P. That is, the data owner U may send the random mask $\gamma_i$ in masked form to the virtual key management module P. The master key K may also be selected by the data owner U who owns the data 114.

At block 208, the data owner U may send the random mask $\gamma_i$ to the data processing instance $A_i$.

At block 210, the virtual key management module P may save the master key K XOR the random mask $\gamma_i$ (i.e., K+$\gamma_i$). That is, the virtual key management module P may save the random mask $\gamma_i$ masked by K, where K+$\gamma_i$ is determined by a bit-wise XOR operation. With regard to the system 100, a non-transitory storage medium may be coupled to the virtual key management module P to store any information (e.g., K+$\gamma_i$, $\alpha_j$, etc.) related to the virtual key management module P.

At block 212, the data processing instance $A_i$ may save the random mask $\gamma_i$. The random mask $\gamma_i$ may be used by the ephemeral instantiation of the corresponding data processing instance $A_i$ for operations related to data object encryption, decryption, or authentication, or authentication validation. With regard to the system 100, a non-transitory storage medium may be coupled to the data owner U to store any information (e.g., $\gamma_i$, $S_j$, etc.) related to the data owner U and the data processing instance $A_i$.

With respect to the data processing instance generation protocol 200, the secrecy of the master key K with respect to the data processing instance $A_i$ may be ensured by the security of the asymmetric encryption technique that is used. The secrecy of the master key K with respect to the virtual key management module P may be ensured based on the mask being chosen at random, and not being known to the virtual key management module P.

Figure 3:
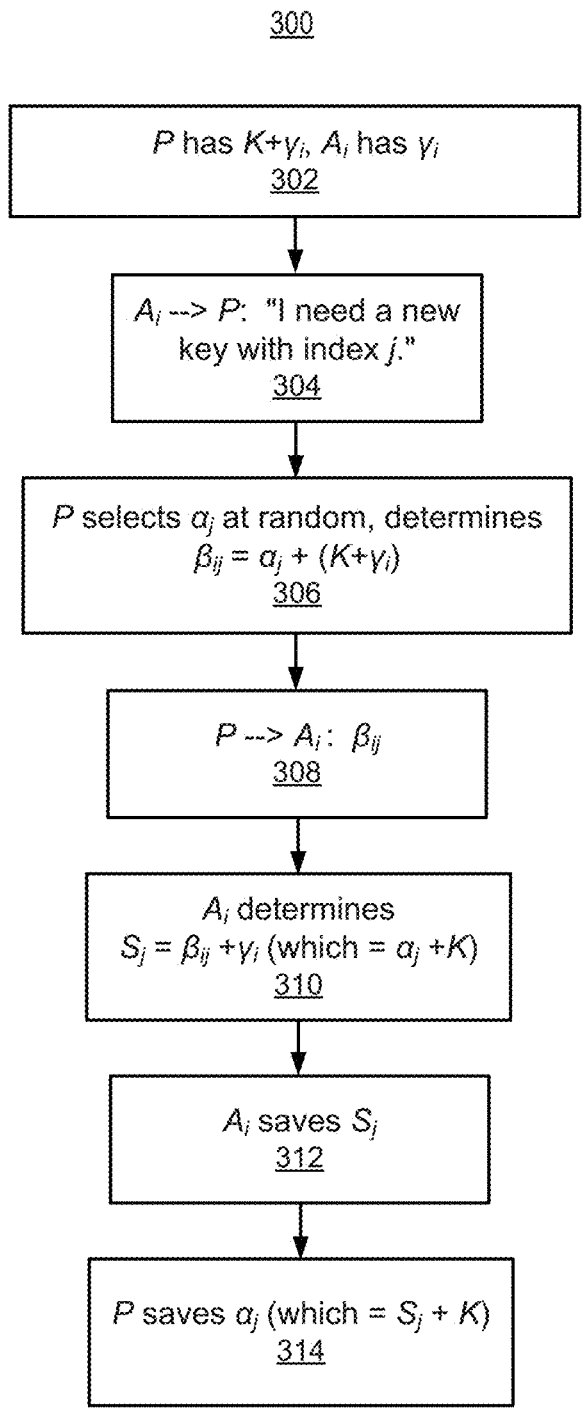
FIG. 3 illustrates a flowchart of a data repository key generation protocol for the key splitting system of FIG. 1, according to an example of the present disclosure.

FIG. 3 illustrates the flowchart of the data repository key generation protocol 300, according to an example of the present disclosure. Based on the set-up of the instance-specific masking $K+\gamma_i$ of the master key K, this instance-specific masking may be used to protect specific keys $S_j$ for encryption, decryption, or authentication, or validating the authentication of storage objects. This may be done by having the data processing instance $A_i$ interact with the virtual key management module P, where the virtual key management module P may store blinded versions of the various specific keys. The data repository key generation protocol 300 may provide for the $j^{th}$ specific key $S_j$ to be accessed by subsequent unrelated instantiations of the data processing instance.

Referring to FIG. 3, at block 302, based on blocks 210 and 212 of the data processing instance generation protocol 200 for data processing instance $A_i$, the virtual key management module P may retrieve or otherwise receive as input the saved master key K XOR the random mask $\gamma_i$ (i.e., $K+\gamma_i$), and the data processing instance $A_i$ may retrieve or otherwise receive as input the saved random mask $\gamma_i$.

At block 304, the data processing instance $A_i$ may forward a request to the virtual key management module P to generate a new key with index j. As described herein, the new key with index j may be determined based on a random selection by the virtual key management module P.

At block 306, the virtual key management module P may select $\alpha_j$ at random, and determine $\beta_{ij}=\alpha_j$ XOR (K XOR $\gamma_i$) (i.e., $\beta_{ij}=\alpha_j+(K+\gamma_i)$). For block 306, $\alpha_j$ and $\beta_{ij}$ may represent masks that are used for blinding purposes.

At block 308, the virtual key management module P may send $\beta_{ij}$ to the data processing instance $A_i$.

At block 310, the data processing instance $A_i$ may determine the $j^{th}$ specific key $S_j$ as $\beta_{ij}$ XOR $\gamma_i$ (which is equal to $\alpha_j$ XOR K).

At block 312, the data processing instance $A_i$ may save the $j^{th}$ specific key $S_j$.

At block 314, the virtual key management module P may save $\alpha_j$ (which is equal to $S_j$ XOR K).

With respect to the data repository key generation protocol 300, the string $S_j$ output by the data processing instance $A_i$ may represent the $j^{th}$ specific key $S_j$. In some examples, instead of using the keys $S_j$ directly for handling data, the keys $S_j$ may be fed as inputs to a key-derivation function (KDF) whose outputs are used as data-handling keys. In this manner, related-key attacks may be avoided on the data stored by the virtual key management module P, where the data includes the values $K+S_1$, $K+S_2$, ..., $K+S_j$, etc.

Figure 4:
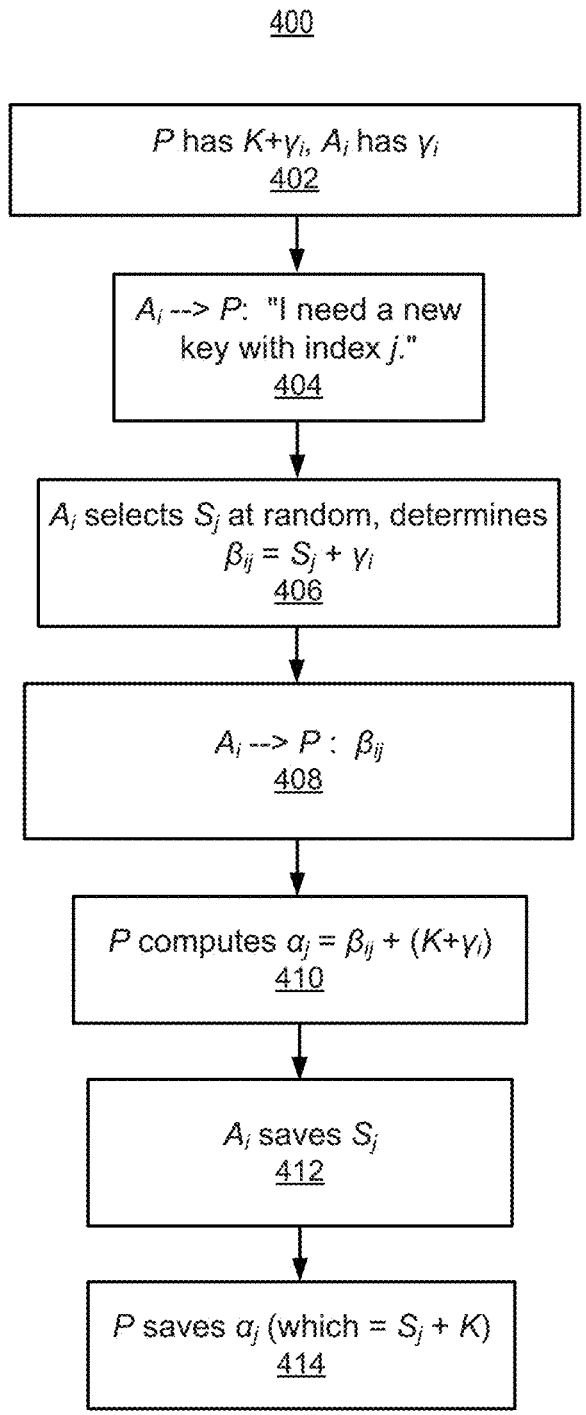
FIG. 4 illustrates a flowchart of a data processing instance key generation protocol for the key splitting system of FIG. 1, according to an example of the present disclosure.

FIG. 4 illustrates the flowchart of the data processing instance key generation protocol 400, according to an example of the present disclosure.

Referring to FIG. 4, at block 402, based on blocks 210 and 212 of the data processing instance generation protocol 200 for data processing instance $A_i$, the virtual key management module P may retrieve or otherwise receive as input the saved master key K XOR the random mask $\gamma_i$ (i.e., $K+\gamma_i$), and the data processing instance $A_i$ may retrieve or otherwise receive as input the saved random mask $\gamma_i$.

At block 404, the data processing instance $A_i$ may forward a request to the virtual key management module P for a new key with index j. As described herein, the new key with index j may be determined based on a random selection by the data processing instance $A_i$.

At block 406, the data processing instance $A_i$ may select the $j^{th}$ specific key $S_j$ at random, and determine $\beta_{ij}=S_j$ XOR $\gamma_i$, (i.e., $\beta_{ij}=S_j+\gamma_i$).

At block 408, the data processing instance $A_i$ may forward $\beta_{ij}$ to the virtual key management module P.

At block 410, the virtual key management module P may determine $\alpha_j$ as $\beta_{ij}$ XOR (K XOR $\gamma_i$), (i.e., $\alpha_j=\beta_{ij}+(K+\gamma_i)$).

At block 412, the data processing instance $A_i$ may save the $j^{th}$ specific key $S_j$.

At block 414, the virtual key management module P may save $\alpha_j$ (which=$S_j$ XOR K).

With respect to the data processing instance key generation protocol 400, the string $S_j$ output by the data processing instance $A_i$ may represent the $j^{th}$ specific key $S_j$. In some examples, instead of using the keys $S_j$ directly for handling data, the keys $S_j$ may be fed as inputs to a KDF whose outputs are used as data-handling keys. In this manner, related-key attacks may be avoided on the data stored by the virtual key management module P, where the data includes the values $K+S_1$, $K+S_2$, ..., $K+S_j$, etc.

Figure 5:
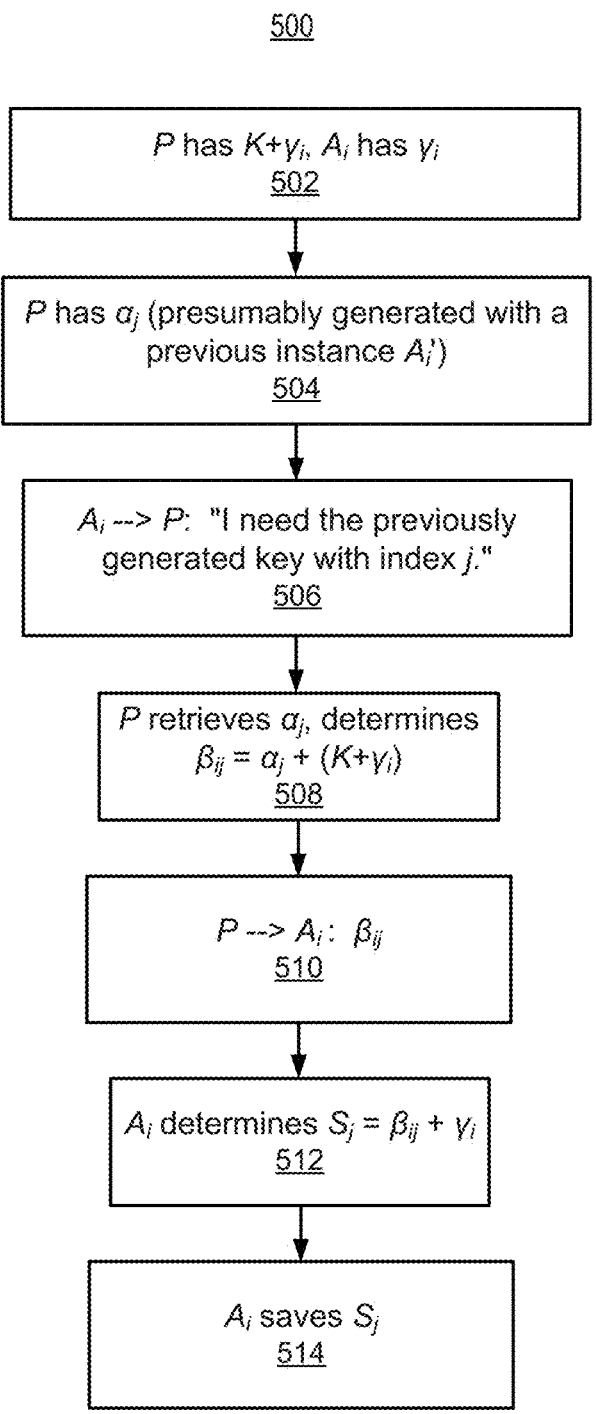
FIG. 5 illustrates a flowchart of a previous storage object retrieval protocol for the key splitting system of FIG. 1, according to an example of the present disclosure.

FIG. 5 illustrates a flowchart of the previous storage object retrieval protocol 500, according to an example of the present disclosure, to retrieve a previous (i.e., an older) storage object from the data repository 112.

At block 502, based on blocks 210 and 212 of the data processing instance generation protocol 200 for data processing instance $A_i$, the virtual key management module P may retrieve or otherwise receive as input the saved master key K XOR the random mask $\gamma_i$ (i.e., $K+\gamma_i$), and the data processing instance $A_i$ may retrieve or otherwise receive as input the saved random mask $\gamma_i$.

At block 504, the virtual key management module P may retrieve or otherwise receive as input $\alpha_j$, where $\alpha_j$ is presumably generated with a previous instantiation of the data processing instance designated as $A_i'$.

At block 506, the data processing instance $A_i$ may forward a request to the virtual key management module P to request the previously generated key with index j. As described herein, the previously generated key with index j may be determined based on a random selection by the data processing instance $A_i$.

At block 508, the virtual key management module P may retrieve $\alpha_j$, and determine $\beta_{ij}=\alpha_j$ XOR (K XOR $\gamma_i$), (i.e., $\beta_{ij}=\alpha_j+(K+\gamma_i)$).

At block 510, the virtual key management module P may forward $\beta_{ij}$ to the data processing instance $A_i$.

At block 512, the data processing instance $A_i$ may determine the $j^{th}$ specific key $S_j$ as $\beta_{ij}$ XOR $\gamma_i$, (i.e., $S_j=\beta_{ij}+\gamma_i$).

At block 514, the data processing instance $A_i$ may save the $j^{th}$ specific key $S_j$. In some examples, instead of using the keys $S_j$ directly for handling data, the keys $S_j$ may be fed as inputs to a KDF whose outputs are used as data-handling keys. In this manner, related-key attacks may be avoided on the data stored by the virtual key management module P, where the data includes the values $K+S_1$, $K+S_2$, ..., $K+S_j$, etc.

With respect to the data repository key generation protocol 300, the data processing instance key generation protocol 400, and the previous storage object retrieval protocol 500, the specific key $S_j$ may be used to derive a plurality of keys, one for each data object of a set of data objects of the data 114. Each of the derived keys may be symmetric or asymmetric. The derived keys may be determined so as to form a hierarchy or tree structure, based on the specific key $S_j$. In the case of a hierarchy of keys for an instance of the trusted platform module (TPM) that is an international standard for a secure cryptoprocessor, each node (in the tree) may include two keys, one symmetric and the other asymmetric.

The modules and other elements of the system 100 may be machine readable instructions stored on a non-transitory computer readable medium. In this regard, the system 100 may include or be a non-transitory computer readable medium. In addition, or alternatively, the modules and other elements of the system 100 may be hardware or a combination of machine readable instructions and hardware.

Figure 6:
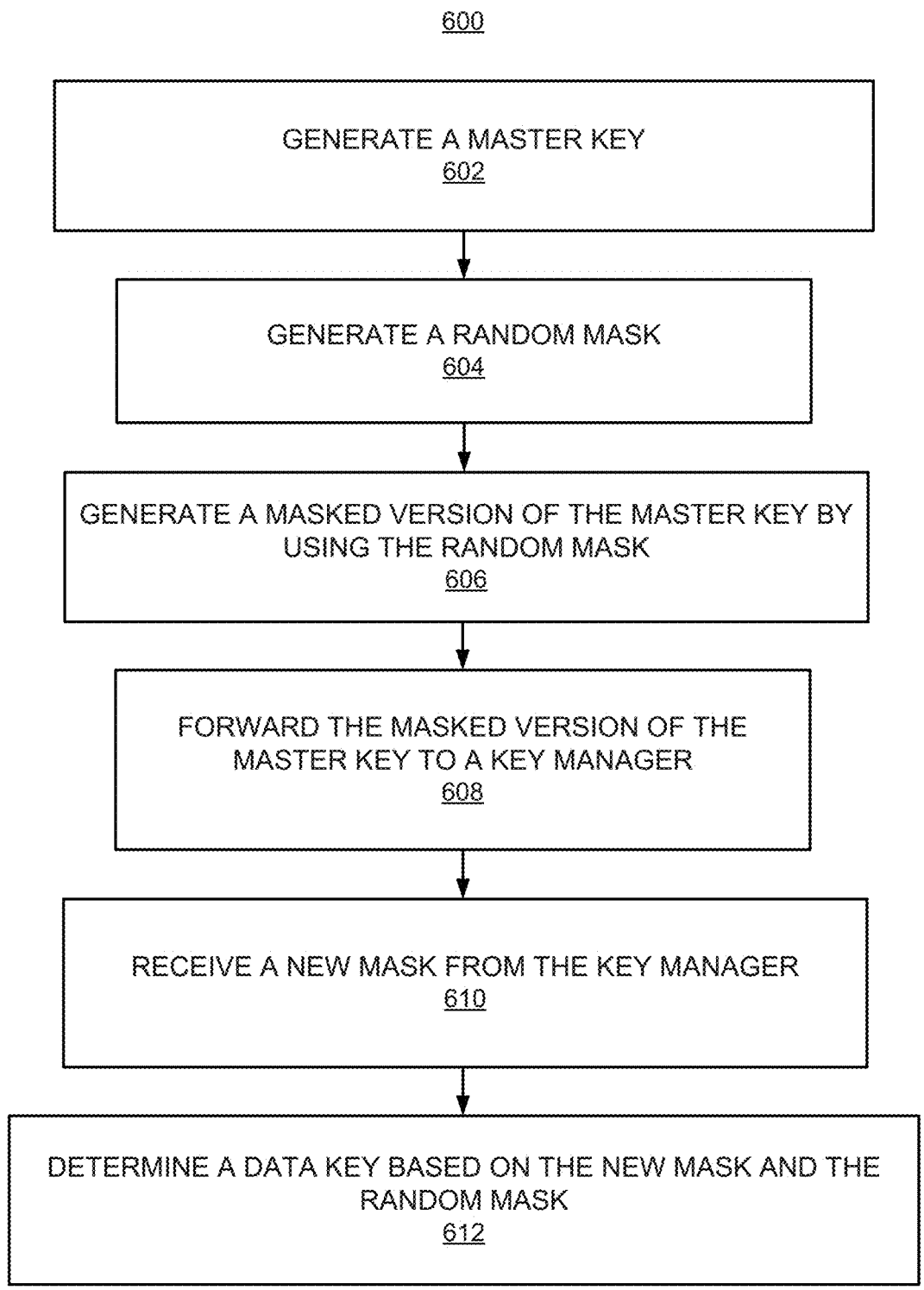
FIG. 6 illustrates a method for key splitting, according to an example of the present disclosure.
Figure 7:
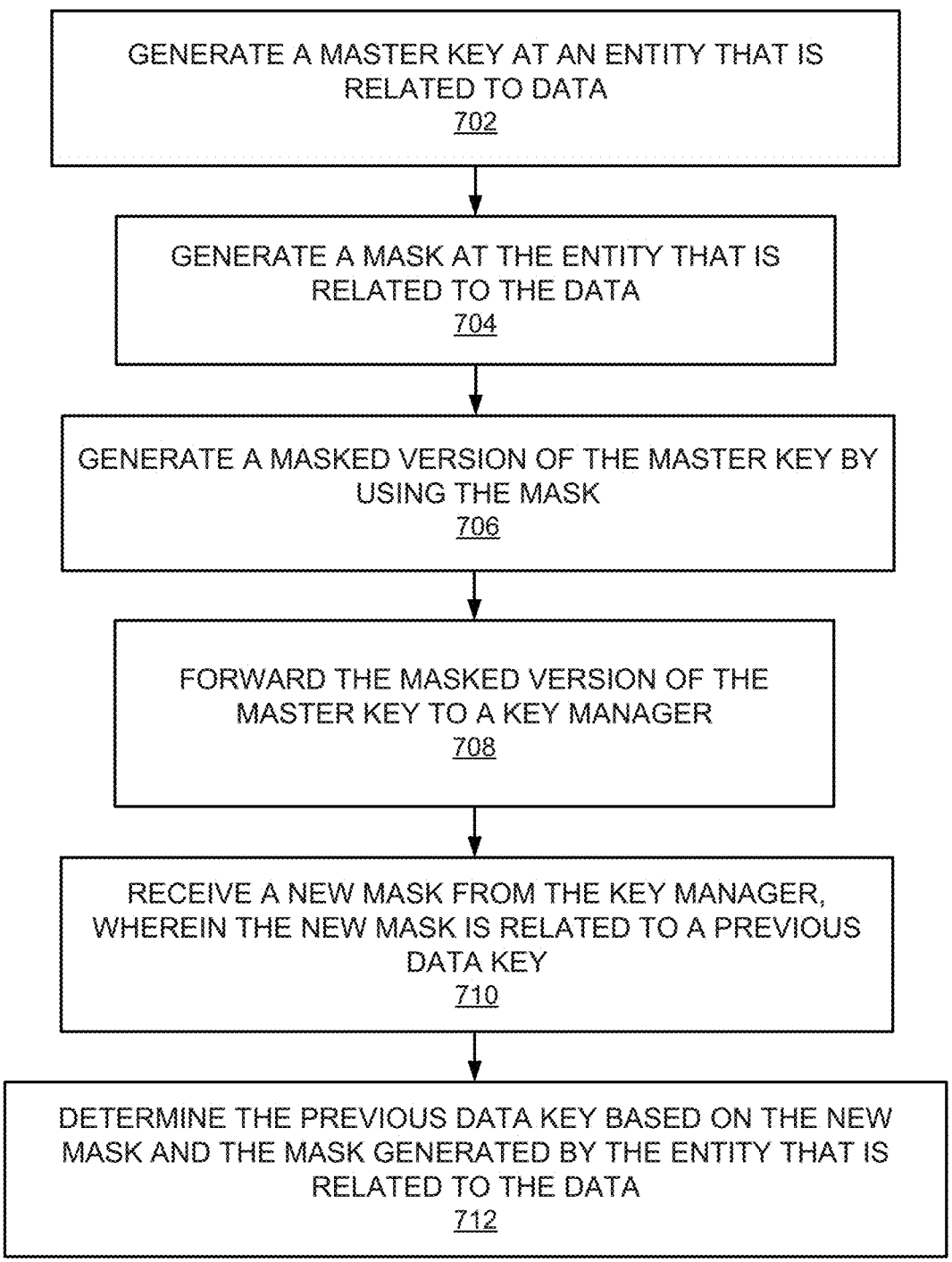
FIG. 7 illustrates further details of the method for key splitting, according to an example of the present disclosure.

FIGS. 6 and 7 respectively illustrate flowcharts of methods 600 and 700 for key splitting, corresponding to the example of the key splitting system 100 whose construction is described in detail above. The methods 600 and 700 may be implemented on the key splitting system 100 with reference to FIGS. 1-5 by way of example and not limitation. The methods 600 and 700 may be practiced in other systems.

Referring to FIG. 6, for the method 600, at block 602, the method may include generating a master key. For example, referring to FIGS. 1 and 2, at block 202, the data owner U may generate the master key K.

At block 604, the method may include generating a random mask. For example, referring to FIGS. 1 and 2, at block 204, the data owner U may generate the random mask $\gamma_i$ (i.e., generate a random value for the mask $\gamma_i$).

At block 606, the method may include generating a masked version of the master key by using the random mask. For example, referring to FIGS. 1 and 2, the data owner U may generate the master key K XOR the random mask $\gamma_i$ (i.e., $K+\gamma_i$).

At block 608, the method may include forwarding the masked version of the master key to a key manager. For example, referring to FIGS. 1 and 2, at block 206, the data owner U may forward the master key K XOR the random mask $\gamma_i$ (i.e., $K+\gamma_i$) to the virtual key management module P.

At block 610, responsive to forwarding the masked version of the master key, the method may include receiving a new mask from the key manager. For example, referring to FIGS. 1-3, at block 308, the data processing instance $A_i$ may receive $\beta_{ij}$ from the virtual key management module $P_i$.

At block 612, the method may include determining a data key based on the new mask and the random mask. For example, referring to FIGS. 1-3, at block 310, the data processing instance $A_i$ may determine the $j^{th}$ specific key $S_j$ as $\beta_{ij}$ XOR $\gamma_i$ (which is equal to $\alpha_j$ XOR K).

According to an example, for the method 600, generating the masked version may include using an XOR, an addition, or a multiplication operation to generate the masked version of the master key (e.g., see block 206 of FIG. 2).

According to an example, for the method 600, determining the data key based on the new mask and the random mask may include determining the data key based on an XOR operation between the new mask and the random mask (e.g., see block 310 of FIG. 3).

According to an example, for the method 600, the new mask may be based on a random selection of another mask (e.g., $\alpha_j$) by the key manager and the masked version of the master key (e.g., see block 306 of FIG. 3).

According to an example, the method 600 may further include generating a data processing instance to utilize the data key to encrypt, decrypt, or authenticate the data. For example, referring to FIG. 1, the data processing instance generation module 102 may generate of an instantiation i of the data processing instance 104, with the $i^{th}$ instantiation of the data processing instance 104 being designated $A_i$.

According to an example, for the method 600, generating the data processing instance may further include generating an ephemeral instantiation of the data processing instance to utilize the random mask and the data key to encrypt, decrypt, or authenticate the data, and utilizing another ephemeral instantiation of a data processing instance that utilizes another random mask and another data key to encrypt, decrypt, or authenticate further data.

According to an example, for the method 600, the data may include a set of data objects, and the method 600 may further include using the data key to derive a plurality of data keys, where each data key of the plurality of data keys corresponds to a respective data object of the set of data objects. For example, referring to FIGS. 1-5, and with respect to the data repository key generation protocol 300, the data processing instance key generation protocol 400, and the previous storage object retrieval protocol 500, the specific key $S_j$ may be used to derive a plurality of keys, where each data key of the plurality of data keys corresponds to a respective data object of the set of data objects.

Referring to FIG. 7, for the method 700, at block 702, the method may include generating a master key at an entity that is related to data. For example, referring to FIGS. 1 and 2, at block 202, the data owner U may generate the master key K.

At block 704, the method may include generating a mask at the entity that is related to the data. For example, referring to FIGS. 1 and 2, at block 204, the data owner U may generate the mask $\gamma_i$.

At block 706, the method may include generating a masked version of the master key by using the mask. For example, referring to FIGS. 1 and 2, the data owner U may generate the master key K XOR the mask $\gamma_i$ (i.e., $K+\gamma_i$).

At block 708, the method may include forwarding the masked version of the master key to a key manager. For example, referring to FIGS. 1 and 2, the data owner U may forward the master key K XOR the random mask $\gamma_i$ (i.e., $K+\gamma_i$) to the virtual key management module P.

At block 710, the method may include receiving a new mask from the key manager, where the new mask is related to a previous data key. For example, referring to FIGS. 1, 2, and 5, at block 510, the data processing instance $A_i$ may receive $\beta_{ij}$ from the virtual key management module P, where $\beta_{ij}$ is related to a previous data key $S_j$.

At block 712, the method may include determining the previous data key based on the new mask and the mask generated by the entity that is related to the data. For example, referring to FIGS. 1, 2, and 5, at block 512, the data processing instance $A_i$ may determine the $j^{th}$ specific key $S_j$ as $\beta_{ij}$ XOR $\gamma_i$, (i.e., $S_j=\beta_{ij}+\gamma_i$).

According to an example, for the method 700, the data may include a set of data objects, and the method 700 may further include using the previous data key to derive a plurality of data keys, where each data key of the plurality of data keys corresponds to a respective data object of the set of data objects. For example, referring to FIGS. 1-5, and with respect to the data repository key generation protocol 300, the data processing instance key generation protocol 400, and the previous storage object retrieval protocol 500, the specific key $S_j$ may be used to derive a plurality of keys, where each data key of the plurality of data keys corresponds to a respective data object of the set of data objects.

According to an example, the method 700 may further include generating a data processing instance to utilize the data key to encrypt, decrypt, or authenticate the data. For example, referring to FIG. 1, the data processing instance generation module 102 may generate of an instantiation i of the data processing instance 104, with the $i^{th}$ instantiation of the data processing instance 104 being designated $A_i$.

According to an example, for the method 700, generating the mask at the entity that is related to the data may further include generating a random mask at the entity that is related to the data. For example, referring to FIGS. 1 and 2, at block 204, the data owner U may generate the random mask $\gamma_i$ (i.e., generate a random value for the mask $\gamma_i$).

According to an example, for the method 700, the data may include an index. The new mask may be related to the previous data key by the index of the data. For example, referring to FIGS. 1, 2, and 5, at block 506, the data processing instance $A_i$ may forward a request to the virtual key management module P to request the previously generated key with index j (i.e., the index of the data). The new mask $\beta_{ij}$ may be related to the previous data key $S_j$ by the index j of the data.

According to another example of a key splitting method, key splitting may include receiving a masked version (e.g., $K+\gamma_i$) of a master key K (e.g., see block 206 of FIG. 2). The master key K may be masked by using a mask $\gamma_i$ that is generated at an entity (e.g., the data owner U) that is related to data (e.g., see block 204 of FIG. 2). Key splitting may further include receiving a new mask $\beta_{ij}$ that is based on selection of a previous data key $S_j$ and is further based on the mask $\gamma_i$ that is generated at the entity that is related to the data (e.g., see blocks 406 and 408 of FIG. 4). A further new mask $\alpha_j$ may be determined based on the new mask $\beta_{ij}$ that is based on selection of the previous data key $S_j$ and that is based on the masked version of the master key (e.g., see block 410 of FIG. 4). According to an example, the new mask may be based on a random selection of the previous data key $S_j$ (e.g., see block 406 of FIG. 4). According to an example, the further new mask may be determined based on an XOR operation between the new mask $\beta_{ij}$ and the masked version (e.g., $K+\gamma_i$) of the master key (e.g., see block 410 of FIG. 4).

Figure 8:
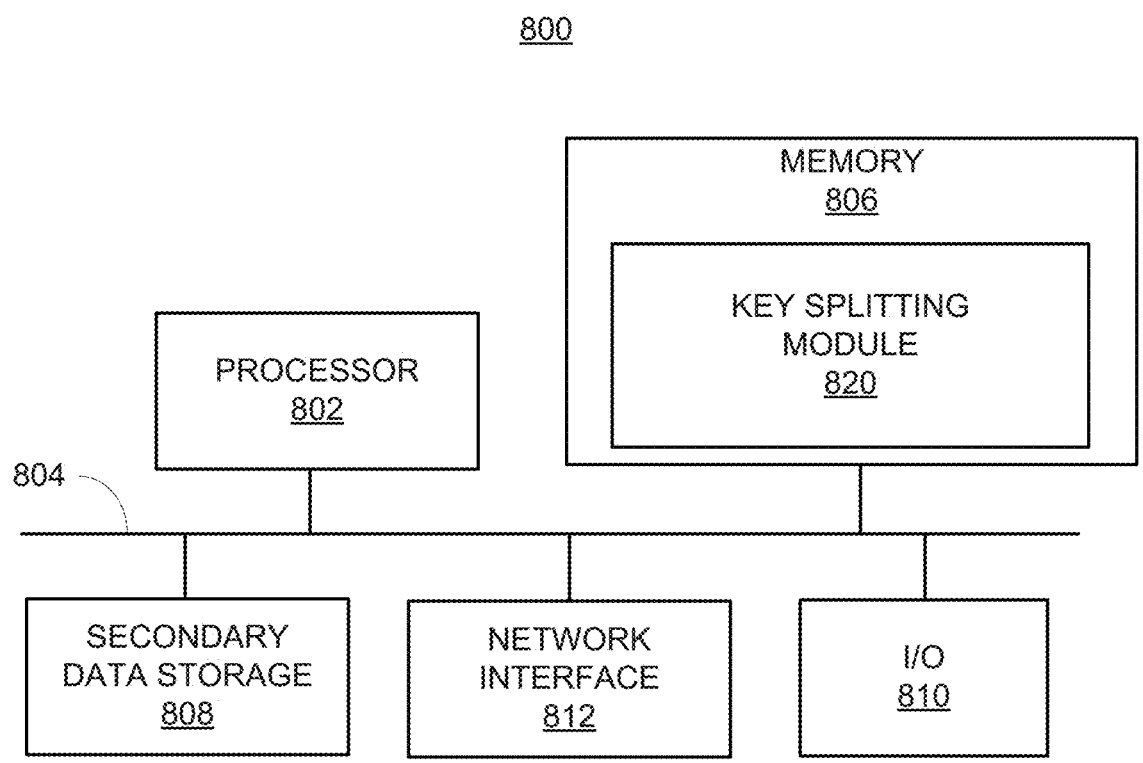
FIG. 8 illustrates a computer system, according to an example of the present disclosure.

FIG. 8 shows a computer system 800 that may be used with the examples described herein. The computer system 800 may represent a generic platform that includes components that may be in a server or another computer system. The computer system 800 may be used as a platform for the system 100. The computer system 800 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions and other processes described herein. Commands and data from the processor 802 may be communicated over a communication bus 804. The computer system may also include a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include a key splitting module 820 including machine readable instructions residing in the memory 806 during runtime and executed by the processor 802. The key splitting module 820 may include the modules of the system 100 shown in FIG. 1.

The computer system 800 may include an I/O device 810, such as a keyboard, a mouse, a display, etc. The computer system may include a network interface 812 for connecting to a network. Other known electronic components may be added or substituted in the computer system.

The foregoing disclosure describes a number of examples for key splitting. The disclosed examples may include systems, devices, computer-readable storage media, and methods for key splitting. For purposes of explanation, certain examples are described with reference to the components illustrated in FIGS. 1-8. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A non-transitory computer-readable medium having stored thereon machine readable instructions that when executed cause a first computing device to:
   perform key splitting without using a homomorphic encryption technique, the key splitting comprising:
      obtaining a master key;
      obtaining a random mask;
      obtaining a masked version of the master key by performing an operation on the master key and the random mask, the operation selected from among an exclusive or (XOR), a multiplication, or a division;
      forwarding the masked version of the master key from the first computing device to a key manager computing device;
      responsive to the forwarding of the masked version of the master key, receiving a new mask from the key manager computing device;
      determining a data key based on an XOR of the new mask and the random mask; and
   use, by a data processing instance in the first computing device, the data key in encrypting, decrypting, or authenticating data.

2. The non-transitory computer readable medium according to claim 1, wherein the new mask is based on a random selection of another mask by the key manager computing device and the masked version of the master key.

3. The non-transitory computer readable medium according to claim 1, further comprising machine readable instructions that when executed cause the first computing device to:
generate the data processing instance to utilize the data key to encrypt, decrypt, or authenticate the data.

4. The non-transitory computer readable medium according to claim 3, wherein the machine readable instructions to generate the data processing instance comprise instructions to:
generate an ephemeral instantiation of the data processing instance to utilize the random mask and the data key to encrypt, decrypt, or authenticate the data; and
utilize another ephemeral instantiation of a data processing instance that utilizes another random mask and another data key to encrypt, decrypt, or authenticate further data.

5. The non-transitory computer readable medium according to claim 1, wherein the data comprises a set of data objects, and wherein the machine readable instructions further comprise instructions that when executed cause the first computing device to:
use the data key to derive a plurality of data keys, wherein each data key of the plurality of data keys corresponds to a respective data object of the set of data objects.

6. A method comprising:
performing, by a first computing device comprising a hardware processor, key splitting without using a homomorphic encryption technique, the key splitting comprising:
receiving a master key;
receiving a random mask;
generating a masked version of the master key by performing an operation on the master key and the random mask, the operation selected from among an exclusive or (XOR), a multiplication, or a division;
forwarding, by the first computing device, the masked version of the master key to a key manager computing device;
receiving, by the first computing device, a new mask from the key manager computing device responsive to the forwarding of the masked version of the master key to the key manager computing device;
determining, by the first computing device, a data key based on an XOR of the new mask and the random mask; and
using, by the first computing device, the data key in encrypting, decrypting, or authenticating data.

7. The method according to claim 6, wherein the data comprises a set of data objects, and wherein the method further comprises:
using, by the first computing device, the data key to derive a plurality of data keys, wherein each data key of the plurality of data keys corresponds to a respective data object of the set of data objects.

8. The method according to claim 6, further comprising:
generating, by the first computing device, a data processing instance to utilize the data key to encrypt, decrypt, or authenticate the data.

9. The method according to claim 6, wherein the data comprises an index, and wherein the new mask is related to the data key by the index of the data.

10. The non-transitory computer readable medium according to claim 1, wherein the new mask is based on an XOR of a further randomly selected mask, the master key, and the random mask at the key manager computing device.

11. The non-transitory computer readable medium according to claim 10, wherein the further randomly selected mask is randomly selected by the key manager computing device.

12. The method according to claim 6, wherein the new mask is based on an XOR of a further randomly selected mask, the master key, and the random mask.

13. The method according to claim 12, wherein the further randomly selected mask is randomly selected by the key manager computing device.

14. A first computing device comprising:
a processor; and
a non-transitory computer-readable storage medium storing instructions executable on the processor to:
perform key splitting without using a homomorphic encryption technique, the key splitting comprising:
obtaining a master key;
obtaining a random mask;
generating a masked version of the master key by performing an exclusive or (XOR) on the master key and the random mask;
forwarding the masked version of the master key to a key manager computing device;
receiving a new mask from the key manager computing device responsive to the forwarding of the masked version of the master key;
determining a data key based on an XOR of the new mask and the random mask; and
use, by a data processing instance, the data key in encrypting, decrypting, or authenticating data.

15. The first computing device according to claim 14, wherein the new mask is based on an XOR of a further randomly selected mask, the master key, and the random mask.

16. The first computing device according to claim 15, wherein the further randomly selected mask is randomly selected by the key manager computing device.

17. The first computing device according to claim 14, wherein the instructions are executable on the processor to generate the data processing instance.

18. The first computing device according to claim 17, wherein the generated data processing instance is an ephemeral data processing instance.

* * * * *